United States Patent [19]

Kanavy et al.

[11] Patent Number: 5,544,298
[45] Date of Patent: Aug. 6, 1996

[54] CODE GENERATION AND DATA ACCESS SYSTEM

[75] Inventors: Walter J. Kanavy, Scranton; Timothy P. Brown, Dunmore, both of Pa.

[73] Assignee: Data Management Corp., Del.

[21] Appl. No.: 7,595

[22] Filed: Jan. 22, 1993

[51] Int. Cl.$^6$ ........................................ G06F 3/14
[52] U.S. Cl. ........................................ 395/155; 395/161
[58] Field of Search ........................ 395/155, 161, 395/159, 157, 160, 156, 600; 345/119, 145, 146

[56] References Cited

U.S. PATENT DOCUMENTS

| | | | |
|---|---|---|---|
| 4,796,179 | 1/1989 | Lehman et al. | 364/191 |
| 5,065,347 | 11/1991 | Pajak et al. | 395/159 |
| 5,187,788 | 2/1993 | Marmelstein | 395/700 |
| 5,255,363 | 10/1993 | Seyler | 395/159 X |
| 5,261,043 | 11/1993 | Wolber et al. | 395/159 |
| 5,313,574 | 5/1994 | Beethe | 395/159 |
| 5,313,575 | 5/1994 | Beethe | 395/159 |
| 5,414,838 | 5/1995 | Kolton et al. | 395/161 X |

*Primary Examiner*—Raymond J. Bayerl
*Assistant Examiner*—Crescelle N. dela Torre
*Attorney, Agent, or Firm*—Brumbaugh, Graves, Donohue & Raymond

[57] ABSTRACT

A system for code generation and data access which overcomes many of the problems in conventional database and spreadsheet applications. A user is able to build up program steps, having available, as needed, information on the permissible operations, on the fields present in the data files in use, and on the actual contents of pertinent fields in the data files. When setting up a selection statement, for example, the user is able to view in real time a concordance of contents of a field; in the concordance display the actual contents are shown in sorted sequence and with duplicates suppressed. The display allows the user to generate code without any need for repeated referral to lists of fields. Duration from start to finish of generating workable code, including meaningful selection statements, is greatly improved.

7 Claims, 3 Drawing Sheets

TEMPLATE EXAMPLES

| OPERATOR | TEMPLATE |
|---|---|
| Add | Add [ ] To [ ] Giving [ ] |
| Multiply | Multiply [ ] By [ ] Giving [ ] |
| Write | Write [ ] Using [ ] |
| Get_Days | Get_Days [ ] To [ ] Giving [ ] Days |
| Perform | Perform [ ] Thru [ ] |

CODE GENERATION AND DATA ACCESS SYSTEM

BACKGROUND OF THE INVENTION

Personal computers are everywhere, yet for most users of database applications it is still not easy to get the information they need and to manipulate that information to get the answers they need. This invention relates generally to database and computational applications and relates particularly to an improved system permitting users to retrieve information from databases and to create programs for manipulation of the data and for performing computations on the data.

One commonly used application is what is generically called a database application. With such an application, the user is able to enter data on a record-by-record basis, edit selected records, browse through the contents of the database, and print reports based on the contents of the database. Some database applications are called "relational", denoting that a field in a selected record of a first database can be a pointer into a second, related database. Some database applications permit the user to write a program in a specialized language peculiar to the application. One commonly used database application is dBase III, published by Ashton-Tate. Another in common contemporary use is Paradox, published by Borland. In dBase III, which is a relational database application, a user can run a program written in the dBase programming language; the conventionally used extension to the DOS filename for the dBase program is the extension of ".PRG". The PRG program is executed by means of the dBase application serving as an interpreter.

Another commonly used application is what is generically called a spreadsheet application. With such an application, the user is able to fill cells in a two-dimensional array by means of keyboard entries. Each cell contains a numerical value, a formula, or a label. A formula is an expression which may include constants, operations, functions, and references to the contents of other cells. A commonly used spreadsheet application is Lotus 1-2-3; another is Excel published by Microsoft. Lotus also permits cells to contain "macros", expressions which contain programming steps interpreted by the Lotus application.

Most database applications have the drawback that programming is quite difficult. It is estimated that well over nine-tenths of the users of dBase, for example, never write any programs in the native dBase programming language, but only perform menu-driven activities such as the aforementioned editing and browsing. Among the many factors making programming difficult are the cumbersome requirements for creating and debugging database programs. The user must typically type in the entirety of a programming line, including the operations, field names, constants, etc. that make up a valid line of program. Syntax and data type mismatch errors are commonplace and cumbersome. Numerical operations such as summing and subtotaling are not easy, nor are operations intended to apply across all records, e.g. to increase the contents of a selected field by a percentage.

With many database applications, one who would write a program is constantly faced with having to try to keep in mind the names of fields in each database that is to be used. If two database files are to be accessed at once, the user will often have the additional complication of a field name turning up in more than one database file, which must also be kept in mind. The user will enter one or more program lines and then execute them. At execution time the user may learn, for the first time, that fields of inconsistent data type are being added, that there is an error in the syntax of the entered lines, or that a nonexistent field has been referred to. The user is thus subjected to a debugging cycle of numerous iterations just to obtain a runnable program, and only after that is the user in a position to check the program for logical correctness and finishing touches.

Most spreadsheet applications are also difficult to program. As with database applications, it is estimated that well over nine-tenths of users of Lotus never create macros to solve problems, but only enter the aforementioned labels, formulas, and constants. While many spreadsheet applications including Lotus have commands and menu choices (including sorting and looking up) intended to permit use of the spreadsheet for database purposes, most users have trouble using them.

When conventional database or spreadsheet applications are employed, a not infrequently encountered task is selecting records for further processing and analysis. In dBase, for example, one does what is called setting a "filter" to cause the display and processing only of records meeting a criterion.

An example will show how selecting records is inconvenient and problematical with present-day applications. A user may be working with a database file having a field for a Zip code, and may wish to arrive at statistics based on the records having a particular Zip code. The user will write a program in which, at the outset a selection step is performed setting a filter so that only records having the particular Zip code are considered for further computation. After executing the program, the user will obtain the desired data, but only, of course, after the usual iterative process of revising the program. After the program is debugged, there could be the unhappy news that there are no records matching the desired Zip code.

It would be helpful to many users of database and spreadsheet applications if there were a way to generate program steps permitting the user to give more attention to the step being generated and less to pesky aspects such as (1) having to remember the fields which can be used in the step, and (2) having to get the syntax and data types right on the first try. It would be additionally helpful to such users if there were a way to find out, and the time of generating the code relating to selecting records, the universe of actual values in the fields being used in the selection process.

SUMMARY OF THE INVENTION

The invention comprises a system for code generation and data access, which overcomes many of the problems in conventional database and spreadsheet applications. A user is able to build up program steps, having available, as needed, information on the permissible operations, on the fields present in the data files in use, and on the actual contents of pertinent fields in the data files. When setting up a selection statement, for example, the user is able to view in real time a concordance of contents of a field; in the concordance display the actual contents are shown in sorted sequence and with duplicates suppressed. The display allows the user to generate code without any need for repeated referral to lists of fields and the like. Duration from start to finish of generating workable code, including meaningful selection statements, is greatly improved.

DESCRIPTION OF THE DRAWING

The invention will be described with respect to a drawing, of which.

DETAILED DESCRIPTION

Figure 1:
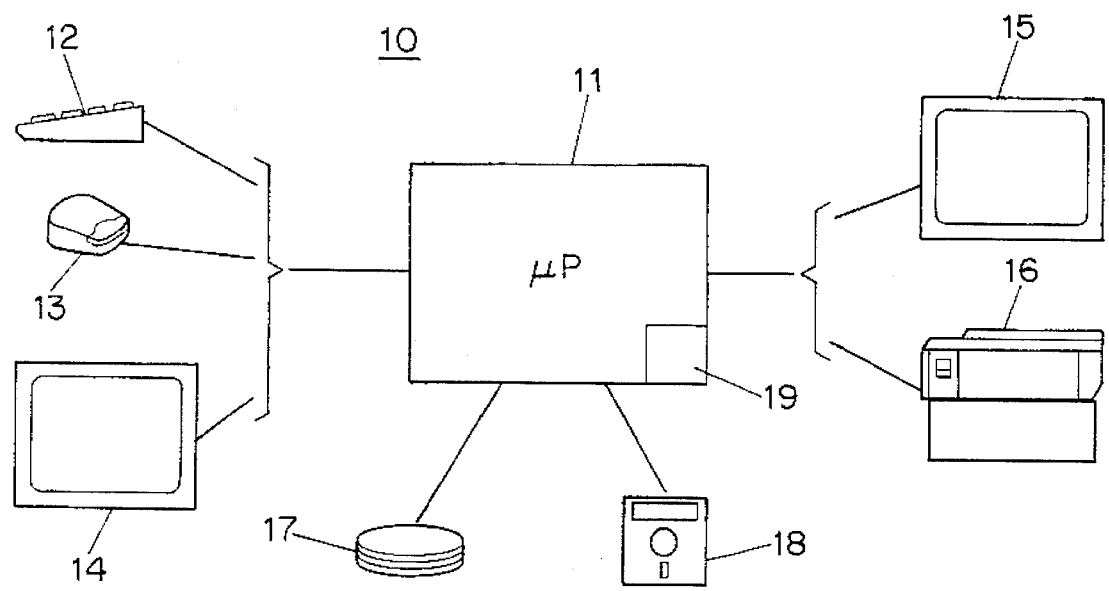
FIG. 1 shows the hardware configuration of the system of the invention.

The exemplary embodiment will be described with respect to a microprocessor-based hardware platform, shown in FIG. 1. A microprocessor 11 has RAM 19; preferably the processor is an Intel 80386 and the memory is at least four megabytes. Hard disk drive 17 and floppy disk drive 18 are coupled with the processor. While the main input device is a keyboard 12, many of the input activities described below are efficiently performed by use of a pointing device such as a mouse 13. It is anticipated that a touchscreen 14 could be employed as well, if sufficiently fine resolution were available. Finally, though the most frequently employed output device is the cathode-ray tube (CRT) screen 15, other display technologies such as liquid crystal display (LCD) may be used. Any outputs capable of being directed to the screen may also be directed to a printer 16. The entire hardware platform is assumed to have a conventional operating system, preferably MS-DOS.

Figure 2:
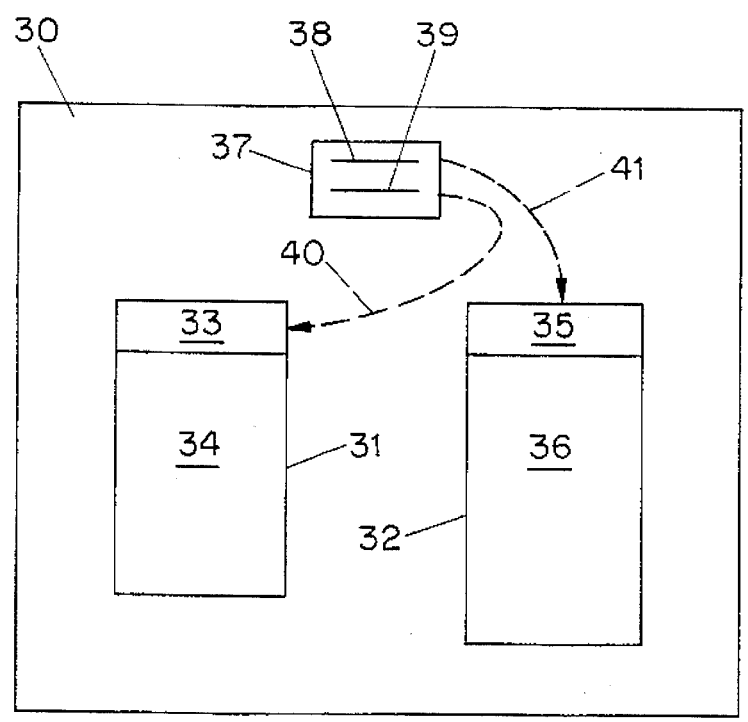
FIG. 2 shows a typical file structure for data files to be manipulated by the system according to the invention.

In the general case, users of the system according to the invention are manipulating the contents of data files, such as files 31 and 32 in FIG. 2 which portrays a typical disk file storage. Employing the standard file directory facilities of the operating system, a directory 37 has entries 38, 39 relating to files in the file storage, and pointer relationships 41, 40 respectively permit access to the file contents 31, 32 based on the file names 38, 39. Normally everything in FIG. 2 described up this point is concealed from the user, and from the author of an application, due to the file and directory services provided by the operating system.

In database applications it is commonplace for a database file to have a predefined internal structure. As shown in FIG. 2, a database file 31 will have a first region or header 33, which does not contain database data but rather contains information defining the fields in each record of the database. The field definitions include the field name, the data type for the field, and the field size. Also present in the header may be information indicative of the number of records and the total size of the file. In many database applications, such as dBase, each record is of constant size regardless of the contents of fields of the record. Other database applications, to conserve disk space, will define the internal structure of the database file to permit records to be of varying lengths, e.g. to take advantage of any spaces in empty or partly-empty fields. The designer of an application will generally select an arbitrary extension and use it as a default extension for a newly created database file. dBase, for example, uses an extension of DBF. The system of the invention employs a default extension of ".CE".

Figure 3:
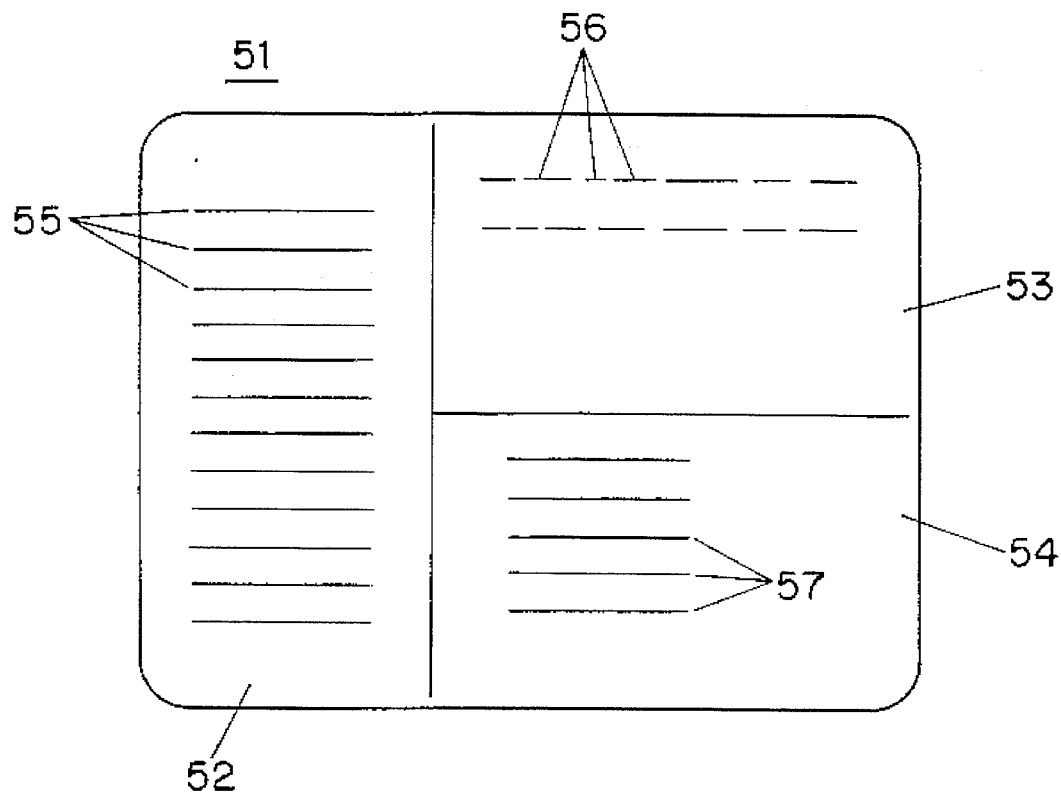
FIG. 3 depicts a display screen including a number of windows.

When the system according to the invention is used, a software application is executed on the hardware platform of FIG. 1. The application, stored in hard disk drive 17, is executed in the conventional way by user inputs to the operating system, as a result of which the application is loaded into the memory 19. Under control of the stored program that is the application, various screens are displayed as described below in response to various user inputs. FIG. 3 shows an "editor" screen, depicting part of a session during which a user is creating (i.e. editing) a program; the screen is composed of various windows. At lower right in window 54 is a region, initially empty, where program lines 57 come into existence during the programming process described below.

Generally when a user is preparing to create a program, the user already has in mind the database upon which the program will operate. If the database does not already exist, the user will create it. Such database creation may be performed according to well-known prior art steps. The user gives a name to the database, lists the field names, specifies the field sizes, and so on. Then the user enters data into records of the database. It is also commonplace, using techniques well known in the art, to import data from other sources, such as quote- and comma-delimited ASCII files, constant-field-width ASCII files, dBase files, and the like. The manner in which the database file is created is in any event not a part of this invention other than in the respect of having an internal structure as described above in connection with FIG. 2.

Figure 4:
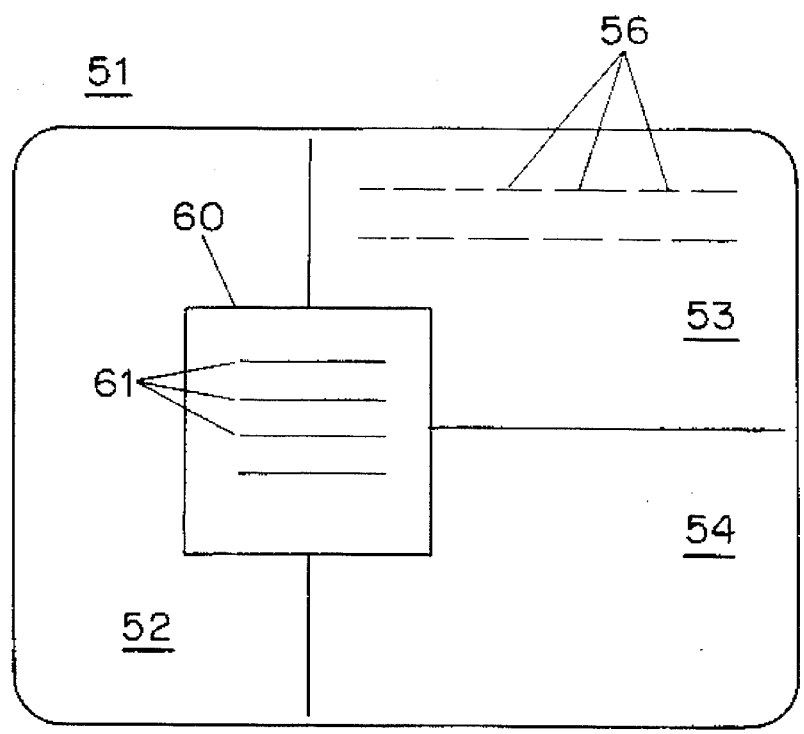
FIG. 4 depicts the screen of FIG. 3 including an additional window relating to names of files such as those of FIG. 2.

In the system according to the invention, the user initiates the activity of selecting a database file by means of a keyboard or mouse input. The application queries DOS for the names of files having an extension of .CE, and the results of the query are presented to the user as shown in FIG. 4. A window 60 is created temporarily, listing database filenames 61. One or more of the database file names is selected by the user, either by keyboard entries or by mouse manipulations. At this point, one of the salient aspects of the system according to the invention is reflected in what is seen on the screen. As each database file 61 is selected, the application makes reference to the field name information for the selected file; as mentioned above the field name information is depicted in FIG. 2 with reference numerals 33, 35. If the user's intention is to access only one database file, then the window 53 comes to be populated with the fields 56 of that database file, and the window 60 disappears. If the user's intention is to access several database files, then the window 53 comes to be populated with the fields 56 of the several database files, after which the window 60 disappears.

A potential ambiguity arises if some particular field name turns up in more than one of the selected database files. This would happen if the field name were to appear in the field definition areas 33 and 35, for example, in FIG. 2. In the system according to the invention, the potential ambiguity is eliminated because the application detects the potential ambiguity and displays, for each indicium 56 relating to that field name, a prefix denoting the file from which the field is taken. To give an example, suppose two database files A and B each contain a field "name". Then if files A and B are selected as in FIG. 4, the application lists two indicia in window 53, "A¦name" and "B¦name". Thus if the user wishes to make later reference to the "name" field in file A, the user will use the mouse to select "A¦name".

Continuing the program creation process, the user now sees a screen like that of FIG. 3, except that the window 54 (which is to contain a display of the program to be created) is empty.

Sometimes a program that manipulates data from a database will be intended by the user to apply to every record in the database. In such a case the program will perform its manipulations on every record in the database. In other cases the user will desire that fewer than all the records of the database be used. In dBase, for example, the user may set a "filter", which contains a logical expression. Generally the expression will work out to be true for some records in the file and false for others. When program execution continues after the filter has been set, the program only acts upon records for which the logical expression evaluates to "true".

In the system according to the invention, selection of records is done by a program step using a "SELECT" operator followed by a logical expression. If a select step is present in the program created by the user, then when the program is executed only records for which the logical expression evaluates as "true" will be acted upon.

Figures 5, 6:
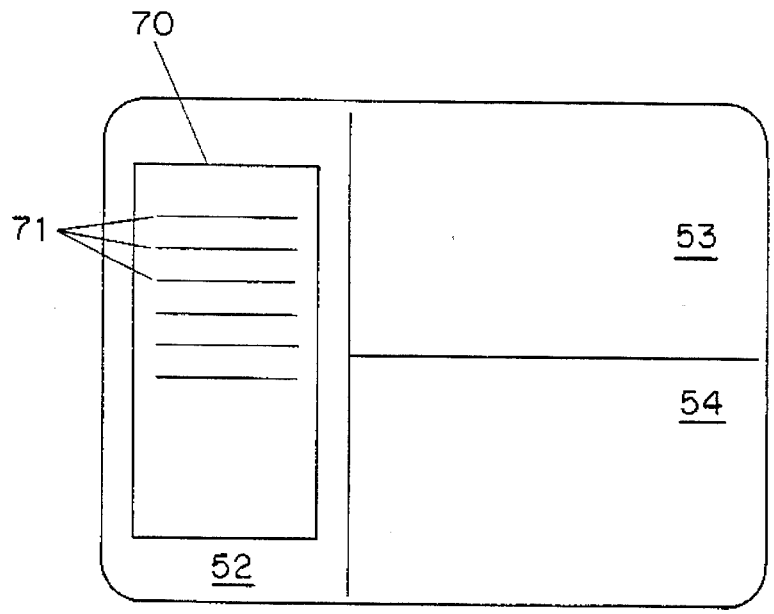
FIG. 5 depicts the screen of FIG. 3 including an additional window relating to actual data values for a field for which an operation is to be performed.
FIG. 6 shows in tabular form typical operations and the templates that result upon their selection.

In the system according to the invention, a user creates a program as will now be described. The user will select one of several operations 55 from the window 52, by means of the mouse 13 or keyboard 12. A template relating to the selected operation will, according to the invention, be positioned in the window 54. The template includes the operation itself (expressed typically in character form but optionally as an icon) and place holders, preferably screen blocks with a differing color or other display characteristic. Typical operations are shown in FIG. 6 in tabular form, and place holders are shown as underscores in the figure. The user then selects one of the placeholders, again by the mouse or keyboard, and has the ability to indicate how the placeholder is to be filled in, as described below in accordance with the invention.

Consider the case of the operation ADD. The user selects the ADD operation by pointing in the window 52, causing an operation template to appear in window 54. The system indicates by the above-mentioned color or other characteristic that a placeholder needs to be filled, such as ADD (first placeholder) TO (second placeholder) GIVING (third placeholder). A typical calculation might be, for each record in the database (or for each selected record in the database) to add the contents of the field COST to the contents of the field MARKUP to yield something called PRICE. In many programming environments, a user would be in the position of having to consult resources elsewhere than on the screen to permit selecting what it is that would be added (i.e. the addend). Then the user would have to type in the name of the addend, which in this example is COST. The manual activity of typing the word COST presents the risk that the word will be misspelled, and the fact of the user consulting resources elsewhere (e.g. printed lists, recollection of file contents, etc.) presents the risk that an erroneous or unintended word will be brought to mind and typed. In the system according to the invention, however, the user is able to select COST from among the field names appearing in window 53. Advantageously this is done by pointing with the mouse, so that the field name itself need not be typed. Advantageously the system according to the invention may also perform data type checking in case the field selected is of a data type that does not match the operation selected.

Having filled in one of the placeholders, the user is then in a position to be able to fill in any remaining placeholders. In the example of the ADD operation, the user may fill in the second addend, by clicking with the mouse on the second placeholder and clicking on the MARKUP field in window 53. As a result, the program entry in window 54 would now read ADD COST TO MARKUP GIVING. Those skilled in the art will note that up to this point no keystroking has taken place, but rather everything has been accomplished by mouse activities. The likely result for users of a variety of backgrounds, including nonprogrammer backgrounds, is that generating a line of program code will have been accomplished more quickly, and the likelihood of inadvertent programming error will have been greatly reduced relative to previously used programming environments.

What remains, in the example for the operation ADD, is for the user to fill the third placeholder. For this example it is assumed that there was not, already in the database, a field called PRICE. In the system according to the invention the user can click on the third placeholder, then type at the keyboard the newly created name PRICE. The label PRICE is added to the labels already appearing in window 53, and becomes available for future pointing activity. At such time as the program is executed the system causes a new field PRICE to come into existence, and stores to it the results of the ADD operation.

Another operation that is advantageously realized in the system according to the invention is the abovementioned SELECT operation. In typical prior art database applications a user might be asked, say, to generate a report containing selected fields for all records for which, say, the state is Massachusetts. After setting a filter (in dBase) or recompiling a program (in an environment in which a compiled program is used to extract data from the database file) there would come a time when information on the screen would let the user know if, for example, there happened to be no records matching the desired state name. As another example, in typical prior art database applications a user might be asked, say, to generate a report containing selected fields for all records for which, say, the dollar value in a specified field falls within certain limits. After setting a filter (in dBase) or recompiling a program (in an environment in which a compiled program is used to extract data from the database file) there would come a time when information on the screen would let the user know if, for example, there happened to be no records for which the specified field falls within the specified limits.

In the system according to the invention, however, much wasted time may be saved due to advantageous aspects of the programming environment. If a SELECT operation is selected by the user, for example, a template as described above appears in window 54. The placeholder is a place where a logical expression may be built up by repeated mouse activity. A simple case will suffice to illustrate the system relating to building up the logical expression. Where it is desired to SELECT records based on the STATE field, the user could point to an operation EQUALS, causing two placeholders to appear in window 54. In the simple case, the first placeholder is intended to be filled with the field name of STATE and the second placeholder will contain a literal expression (here, Massachusetts) for the match test of the record selection. As mentioned above, the user is able to click on the first placeholder, then on the field name STATE appearing in the window 53.

Advantageously, the system according to the invention then prompts the user with a screen permitting a sophisticated way of filling in the second placeholder. As shown in FIG. 5, a window 70 appears, the contents of which are a consequence of the fact that the STATE field is on the other side of the word EQUALS. The system displays as entries 71 a series of lines of displayed material based on the actual contents of the field in the records of the actual database that is being accessed. To do this, the system takes the contents of the field, sorts those contents in a natural order, removes duplicates, and displays what remains after the culling. Using the mouse the user may scroll through the many lines of window 70 to look for MASSACHUSETTS in the present example. When that value is found, the user may click on the value and the value will be moved to the placeholder position in window 54. The results of the culling, with duplicates suppressed or eliminated, maybe termed a concordance.

Those skilled in the art will appreciate that numerous advantages accrue when this preferable aspect of the system of the invention is employed. The user is saved the keystrokes that would be required to type in the literal value MASSACHUSETTS. More subtly, the user is able to identify early on in the programming process the situation that would follow if it happens there are no records for which the STATE field contains MASSACHUSETTS. Finally, the user may be apprised of circumstances where it makes more sense, on reflection, to match on any of several literal values (say, due to the realization that some of the records have the state name spelled out in full while others contain the state name in abbreviated form). And a final example is that the generation of the line of program code is faster and more efficient for the user, compared with prior art programming environments.

After repeated pointing and typing activities, program lines are accumulated in window 54. Those skilled in the art will appreciate that execution of such a program could be accomplished by any of a number of conventional techniques. In the system according to the invention the user selects an "execute" button on the screen 51, as a result of which the program (stored internally in a tokenized form) is interpreted by an interpreter that is part of the system. The type of tokenization and type of interpreter used form no part of this invention other than as a way to realize execution of the accumulated program. In the present system, the screen clears and the results of the execution appear on the screen. Later the screen 51 is restored to view. Alternatively the results of execution may be printed. Upon imminent exit from the application, the user is given an opportunity to indicate whether the original source of the database (e.g. on hard disk) is to be updated based on the results of the program execution.

When the application of the system of the invention has been run by users with a variety of backgrounds, the actual result observed is that users are able to generate workable programs in less time than with prior art programming environments. The programs are seen more often to give the intended result on the first try. Most significantly, the application environment as perceived by many users is not even perceived as a "programming" environment, which for some users removes some of the anxiety that is associated with "programming" as an activity. Rather, it is perceived generally by many users as a report generating or problem solving environment. The practical result is that users who would not characterize themselves as programmers are able to achieve results that heretofore would have required the use of prior art systems usable only by users who do characterize themselves as programmers.

The term "keyboard" as used herein is meant to include not only traditional keyboards but also other commonly employed input devices including speech recognition systems, touchscreens and stylus pads and mice and other pointing devices. Those skilled in the art will doubtless devise other input devices which could be employed instead without departing from the spirit of the invention.

The term "memory" as used herein is meant to include not only traditional hard disk drives but also other commonly employed memory devices including dynamic RAM, battery-backed CMOS RAM, and flash RAM. Those skilled in the art will doubtless devise other memory devices which could be employed instead without departing from the spirit of the invention.

Those skilled in the art will appreciate that while the above-described embodiment has been disclosed with respect to a general-purpose computer executing an application that is a stored program, the invention is not so limited in its scope and utility. For example, random logic circuitry could be employed in lieu of a general purpose computer to provide a dedicated system for performing the database queries and manipulations of the invention without deviating in any way from the scope of the invention.

We claim:

1. A code generation and data access system for use in performing operations upon data in data files comprising records, each record comprising fields, the system comprising:

a display comprising a plurality of windows;

a processor;

a memory;

a keyboard for receiving user inputs;

first means responsive to a first user input for identifying data files and for displaying indicia indicative thereof within a first window of the display;

second means responsive to a second user input for selecting a data file, for retrieving information relating to the fields in the selected data file and displaying the information relating to the fields in a second window of the display;

means for displaying indicia corresponding to operations performable upon data in a third window of the display;

third means responsive to third user inputs for repeatedly selecting an operation from the third window, for displaying within a fourth window a program step template indicative of the selected operation, the template having placeholders, and responsive to fourth user inputs relating to the placeholders for selecting respective field information from the second window, the selected information replacing respective placeholders in the template;

whereby a plurality of program statements indicative of the operations and fields selected by the user appear in the fourth window.

2. The system of claim 1 wherein the third means stores a plurality of program statements each indicative of the operations and fields selected by the user and displayed within the fourth window.

3. The system of claim 2 further comprising:

fourth means responsive to a fourth user input for executing the program statements and for displaying the results of the execution.

4. A code generation and data access system for use in performing operations upon data in data files comprising records, each record comprising fields, the system comprising:

a display comprising a plurality of windows;

a processor;

a memory;

a keyboard for receiving user inputs;

first means responsive to a first user input for identifying data files and for displaying indicia indicative thereof within a first window of the display;

second means responsive to a second user input for selecting a data file, for retrieving information relating to the fields in the selected data file and displaying the information relating to the fields in a second window of the display;

means for displaying indicia corresponding to operations performable upon data in a third window of the display;

third means responsive to third user inputs for repeatedly selecting an operation from the third window, for displaying within a fourth window a program step template indicative of the selected operation, the template having placeholders, and responsive to a fourth user input relating to the placeholders for selecting respective field information from the second window, the selected information replacing a respective placeholder in the template;

the third means further responsive to a fifth user input for displaying within a fifth window actual data values for the field of the selected information from the file containing the field of the selected information;

the third means further responsive to a sixth user input for selecting an actual data value from the fifth window, the selected actual data value replacing a respective placeholder in the template;

whereby a plurality of program statements indicative of the operations, fields, and actual data values selected by the user appear in the fourth window.

5. The system of claim 4 wherein the third means stores a plurality of program statements each indicative of the operations and fields selected by the user and displayed within the fourth window.

6. The system of claim 5 further comprising:

fourth means responsive to a fourth user input for executing the stored program statements and for displaying the results of the execution.

7. The system of claim 6 wherein the operations within the third window include a selection operation selecting less than all of the records in a file, and wherein the fourth means, if the selection operation is among the stored program statements, executes the stored program only with respect to the records selected by the selection operation.

* * * * *